July 7, 1964    J. B. GODWIN    3,140,412
ELECTRICALLY ENERGIZED, POWER OPERATED TOOL DRIVER
Filed April 26, 1960    2 Sheets-Sheet 1
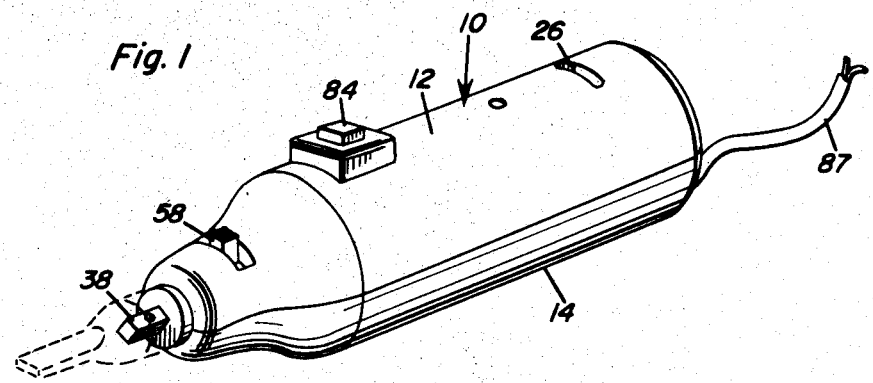
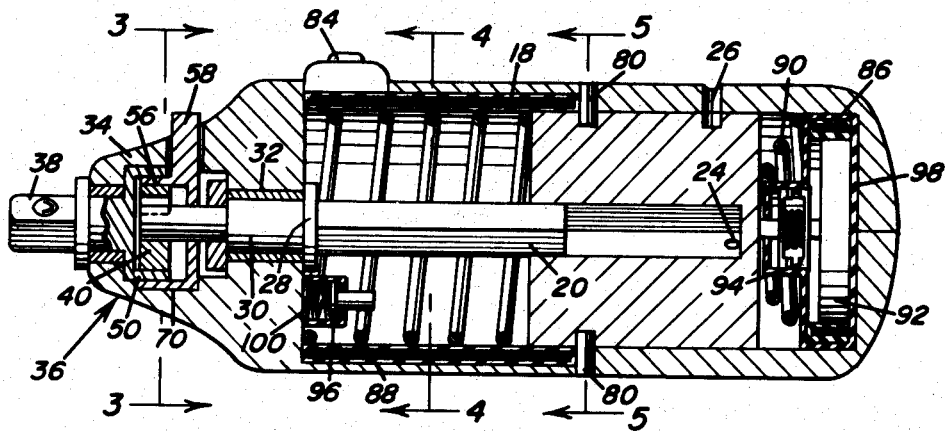
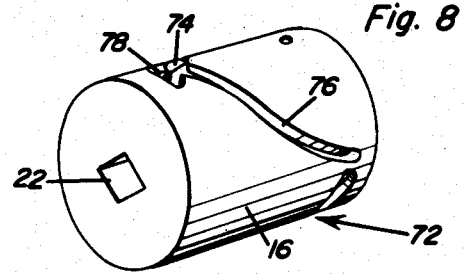
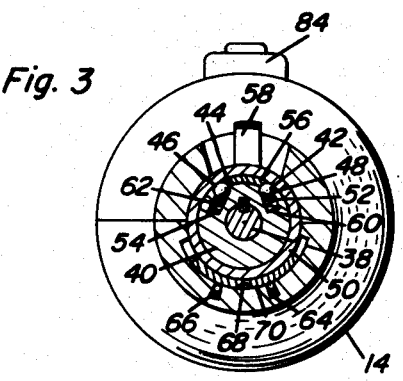
Joseph B. Godwin
INVENTOR.

July 7, 1964         J. B. GODWIN         3,140,412
ELECTRICALLY ENERGIZED, POWER OPERATED TOOL DRIVER
Filed April 26, 1960                        2 Sheets-Sheet 2

Joseph B. Godwin
INVENTOR.

BY

United States Patent Office 3,140,412
Patented July 7, 1964

3,140,412
ELECTRICALLY ENERGIZED, POWER OPERATED TOOL DRIVER
Joseph B. Godwin, 11607 Hanford Armona Road, Hanford, Calif., assignor of fifty percent to Opal F. McDaniel, Tulare, Calif.
Filed Apr. 26, 1960, Ser. No. 24,835
13 Claims. (Cl. 310—23)

This invention relates to a power operated tool driving assembly for driving such tools as screw drivers, socket wrenches, and the like.

The primary object of the invention is to provide a power operated apparatus which is capable of being made to a small scale and employs both mechanical and electrical movements for the driving of tools.

A further object of this invention in accordance with the foregoing object is to provide electric motor means for reciprocating an element and mechanically converting such reciprocatory movement to unidirectional rotation for imparting such movement to a tool.

A further object of the invention in accordance with the foregoing object is to provide an apparatus wherein electrically initiated movement is mechanically converted into unidirectional movement for driving a tool and wherein such tool rotation may be easily and efficiently reversed.

Still another object of the invention in accordance with the preceding object is to provide an apparatus which is electrically powered but utilizes mechanical means to reverse the direction of rotation in which the tool is driven.

An additional object of the invention is to provide a power drive of a tool regardless of the direction of drive without reversing the power means.

It is therefore an object of this invention to provide electrically initiated motive means having a power stroke and a spring biased return stroke in which the power stroke is mechanically converted into unidirectional rotation for driving a tool and wherein said rotation may be reversed and still utilize the power stroke of the motive means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the power tool unit in accordance with this invention, a screw driver attachment being shown applied thereto in dotted lines;

FIGURE 2 is a vertical longitudinal section of the power unit, showing the position of the parts at the beginning of its power stroke;

FIGURE 3 is a vertical transverse sectional view taken substantially upon the plane indicated by the section line 3—3 of FIGURE 2 and showing the reversible one-way clutch device;

FIGURE 8 is a perspective view of the cam element;

Figure 4:
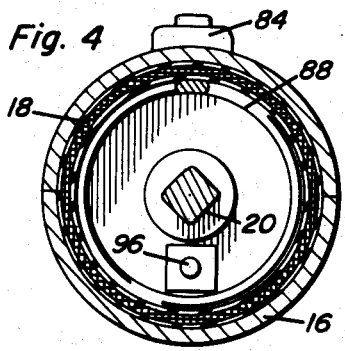
FIGURE 4 is a vertical transverse sectional view taken substantially upon the plane indicated by the section line 4—4 of FIGURE 2.
Figure 5:
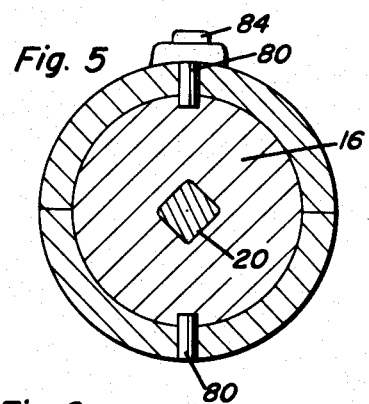
FIGURE 5 is a vertical transverse sectional view taken substantially upon a plane indicated by the section line 5—5 of FIGURE 2.

Referring first to FIGURE 1 it will be observed that the numeral 10 generally designates the power unit shown enclosed within a housing. As seen more clearly in FIGURE 2, the unit is enclosed within a two-section housing as indicated by numerals 12 and 14. The housing sections 12 and 14 form a cylindrical chamber within which is slidably mounted a motive element or armature 16 while within the walls of the cylinder chamber is a power coil winding 18. A drive coupling is established by a squared shaft 20 which extends into the cylinder chamber and a recess 22 formed within the armature 16 and having a similarly squared cross-section so that the shaft 20 is rotatively fast with said armature 16 but slidable relative thereto. An opening 24 is provided at the end of the recess 22 and is in communication with the cylinder chamber so as to prevent the trapping of air and compression thereof by the axial movement of the shaft 20. The cylinder chamber itself is vented by means of openings 26 in the housing section 12. The shaft 20 is held against axial movement by thrust washer 28. Integral with shaft 20 is a shaft section 30 journaled by sleeve bearing 32 within head portion 34 of the housing. The shaft sections 20 and 30 form a drive transmitting assembly that transmits only rotational movement from the armature 16. A reversible one-way clutch mechanism generally indicated by reference numeral 36 is also mounted within the head portion 34 of the housing. A driven member 38 is journaled in the front of the head portion of the housing and extends out therefrom for connection to some tool member in a conventional manner.

Reference is now made more particularly to FIGURES 2 and 3 for an understanding of the reversible one-way clutch device 36. Splined to shaft 30 for rotation therewith, is the inner race 40 of the one-way clutch device. The inner race has formed thereon two clutch camming surfaces 42 and 44. Clutch rollers 46 and 48 are provided between the inner race camming surfaces 42 and 44 to be wedged between said camming surfaces and a cylindrical surface on an annular or cylindrical rim, flange or part 50 which is preferably integral with the driven member 38. Springs 52 and 54 urge the clutch rollers into wedging position. As seen in FIGURE 3, the clutch rollers 46 and 48 are both in wedged position so as to prevent relative rotation between the inner member 40 fixed to the shaft 30 and the part 50 fixed to the driven member 38. Under such conditions wherein the driven member 38 is locked to the power shaft 30 of the unit in both directions the unit may be manually manipulated to drive a tool attached to the driven member 38. A lug 56 is provided between the wedging clutch rollers and when shifted to one or the other of its extreme positions by manual movement of the displaceable selector button 58 to which the lug is attached, one or the other of the cam rollers will be compressed against its spring abutments 60 or 62 to thereby hold one or the other of the clutch rollers out of wedging position. The button 58 is manually shifted between its extreme positions as positively located by the spring pressed detents 64 and 66 cooperating with recess 68 formed on member 70 also secured to said button 58. When the button 58 is pushed to either of its extreme positions, the shaft 30 will be shifted angularly to a slight extent by the lug 56 acting through one of the clutch rollers and spring abutment 60 or 62. The purpose for the aforementioned slight angular displacement of the shaft 30 will become apparent hereafter.

Figure 6:
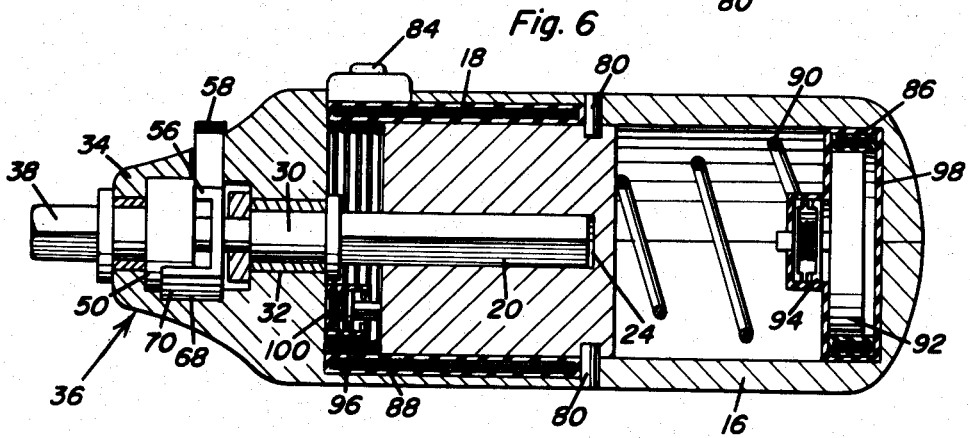
FIGURE 6 is a view similar to that of FIGURE 2 but showing the unit at the end of its power stroke, with parts being shown in elevation for purposes of simplicity.
Figure 7:
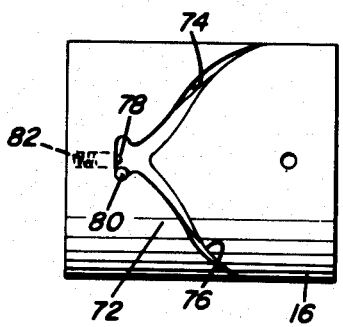
FIGURE 7 is a top plan view of the cam element.

Referring now to FIGURES 2, 6, 7 and 8, 72 refers generally to directional constraining means formed on the cylindrical surface of the armature 16 to produce angular displacement thereof in one direction or the other. As clearly seen in FIGURES 7 and 8, two oppositely directed spiral cam grooves 74 and 76, are separated by a yieldable spring pressed directional conditioning abutment 78. As seen in FIGURE 7, a follower pin 80 engages groove 74. When the armature is held against axial displacement, angularly displacing the armature 16 in a clockwise direction as viewed in FIGURE 8, will force the follower pin 80 past the abutment 78 against the bias of spring 82 to enter the other cam groove 76. Such angular displacement of the armature 16 may be accomplished by angular displacement of shaft 20 and shaft 30 that is rotatively fast with the armature 16. The angular displacement of the shaft 20 and 30 is in turn effected by shifting of the button 58 in a clockwise direction as hereinbefore indicated. Similarly, the follower pin 80 may be shifted from the cam groove 74 to the cam groove 76 by manually shifting the button 58 in a counter-clockwise direction towards its other extreme position.

Figure 9:
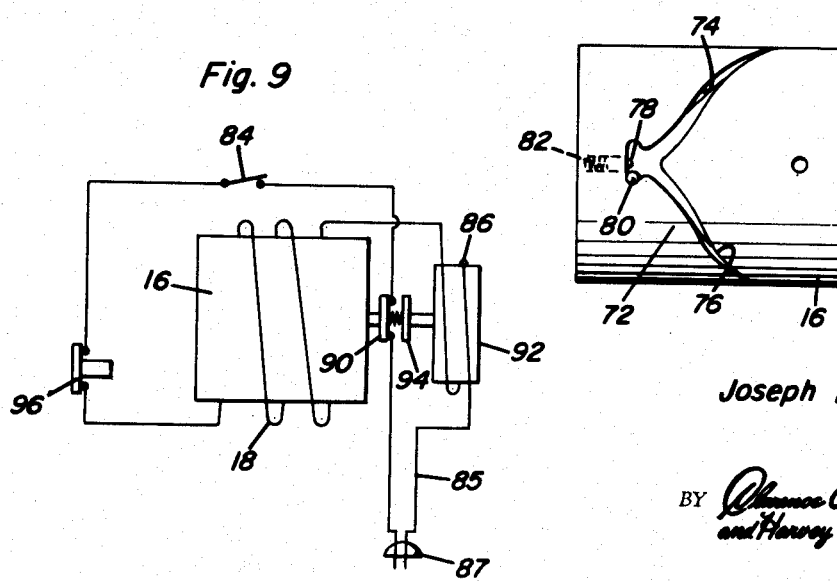
FIGURE 9 is a diagrammatic view of the control circuit for the power unit.

Referring now in particular to FIGURES 2, 6 and 9, it will be observed that the armature 16 is axially shifted between limit positions as illustrated in FIGURES 2 and 6. The follower pin 80 previously referred to is fixed to the housing and hence the axially directed control movements imparted to the armature 16 will cause it to be angularly displaced in driving directions as well. The shaft 20 by virtue of its slidable relation to the armature 16, transmits only the angular displacement of the armature 16. The armature is axially shifted in one direction from its FIGURE 2 position to its FIGURE 6 position by energization of solenoid coil 18. Viewing in particular FIGURE 9, when switch 84 is closed by manual depression, a circuit is completed through wiring 85 connected to a source of current by plug 87, to cause energization of coil windings 18 and 86. The armature 16 is accordingly shifted to the left against the bias of spring 88. Such movement of armature 16 permits switch 90 to open but the energization of the holding coil 86 simultaneously with the power coil 18 causes disk 92 to also shift to the left to close switch 94 so as to maintain the circuit complete. When the armature reaches the end of its stroke as seen in FIGURE 6, it will open the limit switch 96 against its spring bias to thereby open the circuits and de-energize the windings 18 and 86. Spring 88 will then return the armature to its initial position of FIGURE 2. The switches 90 and 94 and disk 92 as well as its energizing coil 86 are conveniently arranged within an enclosure 98 of non-conductive material, at the right end of the unit housing and constitute a starting switch assembly that maintains the coil energizing circuit open after opening of the limit switch 96. Switch 96 is similarly enclosed by casing 100 at the left end of the armature chamber.

From the foregoing description, operation of the power unit will be apparent. In operation, the directional button 58 is manually pushed to one extreme position or the other depending upon the direction of tool rotation desired. Let it be assumed that the button 58 is pushed to its extreme clockwise position as viewed in FIGURE 3. The shaft 30 will accordingly be angularly displaced by a limited initial amount to thereby displace angularly the armature 16 from its position illustrated in FIGURE 7, causing pin 80 to be disposed within the cam groove 76 of the armature if it is not already in said groove.

The button 58 will be held in its clockwise position by means of detent 66 cooperating with recess 68. When the switch button 84 is depressed a circuit is completed through wiring 85 to energize coils 18 and 86. The armature 16 will accordingly be power shifted to the left as viewed in FIGURES 2 and 6, and by virtue of groove 76 on said armature cooperating with the pin 80 on the housing, said armature will be rotated in a counter-clockwise direction. Counter-clockwise rotation of armature 16 is communicated to shafts 20 and 30 and through the wedging action of the one-way clutch roller 46, the rotation in a counter-clockwise direction is imparted to the driven member 38. When the armature reaches its left hand extreme position as seen in FIGURE 6, switch 96 is opened to de-energize the coil winding whereby spring 88 shifts the armature 16 towards the right. Movement of the armature 16 toward the right in its return stroke correspondingly causes the armature to rotate in a clockwise direction which clockwise rotation is also imparted to shafts 20 and 30. In the clockwise direction however, the one-way clutch roller 46 overruns and no clockwise rotation is imparted to the driven member 36. When the button 58 is pushed to its counter-clockwise extreme position, the action of the one-way clutch is reversed as well as the action of the cam mechanism because of the shifting of the pin 80 to the cam groove 74, so that the power stroke now causes clockwise rotation of shaft 20 and 30 which clockwise rotation is then imparted to the driven member. With the switch button 84 depressed therefore, switch 96 and the circuit will be periodically opened by the armature 16 to cause reciprocation of the armature by the coil 18 and depending upon the position to which the directional button 58 had been moved, as above explained, the driven member 38 will be intermittently driven in a counter-clockwise or clockwise direction.

It will therefore be apparent that the rotational movement imparted by the one-way clutches to the tool will always be in phase with powered movement of the armature 16 regardless of the position of the clutch reversing button 58. It should therefore be appreciated that the return spring 88 effecting the return movement of the powered armature 16 will never be loaded by variable loads on the driven tool member regardless of the direction of drive, so as to avoid heavy and variable loading of the springs and also provide a drive that applies a constant and predictable torque to the tool member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power operated tool assembly having a driven member comprising, a housing, a solenoid coil mounted in said housing, a spring biased armature slidably movable within the housing by energization of said coil, switch means operatively connected to the coil and engageable by said armature for imparting movement to the armature, cam means operative to constrain said movement for producing a rotational component in one direction, coupling means for transmitting only the rotational component of movement of said armature, one-way clutch means operatively connected to said coupling means and the driven member for transmitting rotational movements of said coupling means in one direction only to said driven member, and means operatively engageable with the one-way clutch means for simultaneously reversing the one direction of said one-way clutch means and said cam means to directionally reverse powered rotation of the driven member.

2. The assembly as defined in claim 1, wherein the cam means includes two oppositely directed grooves separated by a yieldable obstruction and a pin fixed to said housing engageable in one of said grooves, whereby actuation of said reversing means to reverse the operation of said one-way clutch is operative through said coupling means to rotate said armature so that said pin may pass by said obstruction into the other of said grooves.

3. The assembly as defined in claim 1, wherein said switch means includes a first switch, spring-bias closed and opened by engagement of the armature therewith to de-energize said coil and a second switch device closed by engagement of the armature therewith to permit energization of the coil and including means to maintain energization of said coil until deenergized by said first switch.

4. The assembly as defined in claim 1, wherein said switch means includes yieldable means for limiting movement of said armature.

5. The assembly as defined in claim 1, wherein said housing includes wall means separating the armature and switch means from said one-way clutch means and said coupling means being journaled in said wall means.

6. Power operated drive means for rotatable tool means or the like comprising, casing means, power driven means movably mounted by the casing means for powered and return movements between limits, drive transmitting means operatively connected to the power driven means for alternating movement by said power driven means, and reversible one-way drive means operatively connected to said drive transmitting means for selectively transmitting movement from said drive transmitting means in either direction only during said powered movement of the power driven means, said reversible one-way drive means comprising, oppositely directed clutch means selectively rendered operative to alternatively transmit drive from the drive transmitting means in opposite driving directions, displaceable selector means operatively connected to the clutch means to lock in both said opposite driving directions or in one of said driving directions.

7. In a power operated tool assembly having an armature and a driven member, means for periodically imparting powered movement to the armature in a power direction, means operatively engageable with the armature for directionally constraining angular displacement of the armature in one direction in response to said powered movement imparted thereto periodically, drive transmitting means operatively connecting said armature to the driven member for converting said angular displacement into intermittent rotation of the driven member in said one direction, and selectively operable means operatively engageable with the drive transmitting means for simultaneously reversing the drive of the drive transmitting means and the directional constraint of the constraining means to transmit intermittent rotation to the driven member in a reverse direction during the powered movement of the armature in said power direction, the constraining means including, a pair of intersecting cam tracks mounted on the armature, a follower engageable in one of said cam tracks for producing angular displacement of the armature during movement thereof between limit positions and yieldable confining means operatively mounted at the intersection of said cam tracks for yieldably confining the follower to one of the cam tracks when the armature is at one of the limit positions.

8. The combination of claim 7, wherein the selectively operable means includes, reversing means engageable with the drive transmitting means for limited movement of the armature at said one limit position to relatively displace the follower into the other cam track past the yieldable confining means.

9. The combination of claim 8, wherein said drive transmitting means comprises, an axially fixed shaft slidably connected to the armature for angular displacement therewith, and reversible one-way clutch means operatively connecting said shaft to the driven member.

10. In a power operated tool assembly having an armature and a driven member, means for periodically imparting powered movement to the armature in a power direction, means operatively engageable with the armature for directionally constraining angular displacement of the armature in one direction in response to said powered movement imparted thereto periodically, drive transmitting means operatively connecting said armature to the driven member for converting said angular displacement into intermittent rotation of the driven member in said one direction, and selectively operable means operatively engageable with the drive transmitting means for simultaneously reversing the drive of the drive transmitting means and the directional constraint of the constraining means to transmit intermittent rotation to the driven member in a reverse direction during the powered movement of the armature in said power direction, said drive transmitting means comprising, an axially fixed shaft slidably connected to the armature for angular displacement therewith, and reversible one-way clutch means operatively connecting said shaft to the driven member, said selectively operable means including reversing means rotatably mounted on the shaft and engageable with the one-way clutch means for rendering it operative in one direction and imparting said limited movement to the armature.

11. An electrically energized power operated tool driver comprising a tubular casing, a shaft rotatably mounted by said casing in axially fixed relation, an armature slidably mounted on the shaft for angular movement therewith within the casing, electrical means operatively mounted in the casing for periodically imparting powered movement to the armature between limit positions, spring means mounted within the casing and biasing the armature toward one of said limit positions, a driven member, reversible one-way clutch means rendered operative to drivingly couple the shaft to the driven member for transmitting intermittent unidirectional movement thereto in either direction, selector control means rotatably mounted on said shaft for rendering the one-way clutch means operative in one or the other direction and for initially displacing the shaft and the armature by a limited amount when in said one limit position, cam means operatively connected to the armature and the casing for producing an angular component of movement of the armature in selectively opposite directions during powered movement thereof by the electrical means and return movement by the spring means and means mounted in operative relation to the cam means for controlling the direction of said angular component of movement in response to said initial displacement of the armature to transmit intermittent unidirectional movement to the driven member in either direction only during powered movement of the armature.

12. The combination of claim 11 wherein said last-mentioned means comprises, a yieldable abutment yieldably resisting said initial displacement of the armature, said cam means including intersecting cam tracks, said yieldable abutment projecting into the cam tracks at the intersection thereof and a follower element relatively movable within one of said cam tracks and displaced into the other cam track against the bias of the yieldable abutment in response to said initial displacement of the armature.

13. The combination of claim 11, wherein said electrical means comprises, power coil means, holding coil means connected in series with the power coil means for energization therewith, energizing circuit means rendered operative by the armature at said one limit position to energize said coil means, means actuated by the holding coil means for maintaining the energizing circuit operative during said powered movement of the armature, and limit switch means for interrupting the energizing circuit at the other limit position of the armature.

References Cited in the file of this patent
UNITED STATES PATENTS

| 465,099 | Rice | Dec. 15, 1891 |
| 475,410 | McKay | May 24, 1892 |
| 1,802,459 | Caruso | Apr. 28, 1931 |
| 2,463,536 | Hitt | Mar. 8, 1949 |
| 2,682,175 | Ruckelshaus | June 29, 1954 |
| 2,818,739 | Dowdle | Jan. 7, 1958 |
| 2,860,750 | Avanzati | Nov. 18, 1958 |
| 2,904,728 | Staggs | Sept. 15, 1959 |